Jan. 12, 1926. 1,569,772
R. W. MAYNE
AUTOMOBILE BED
Filed April 24, 1924 3 Sheets-Sheet 2
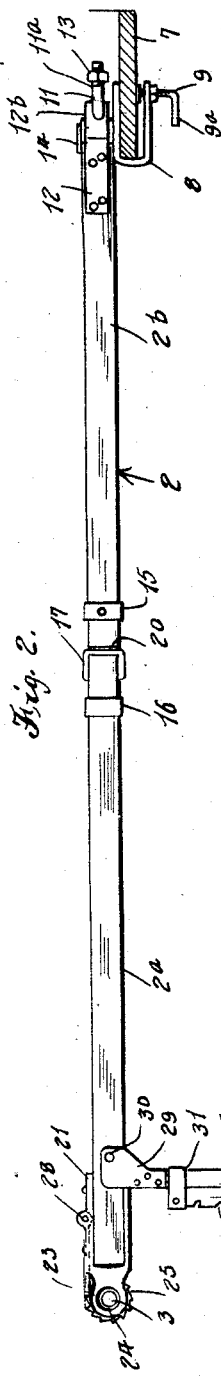
Inventor
R. W. Mayne,
By [signature]
Attorney

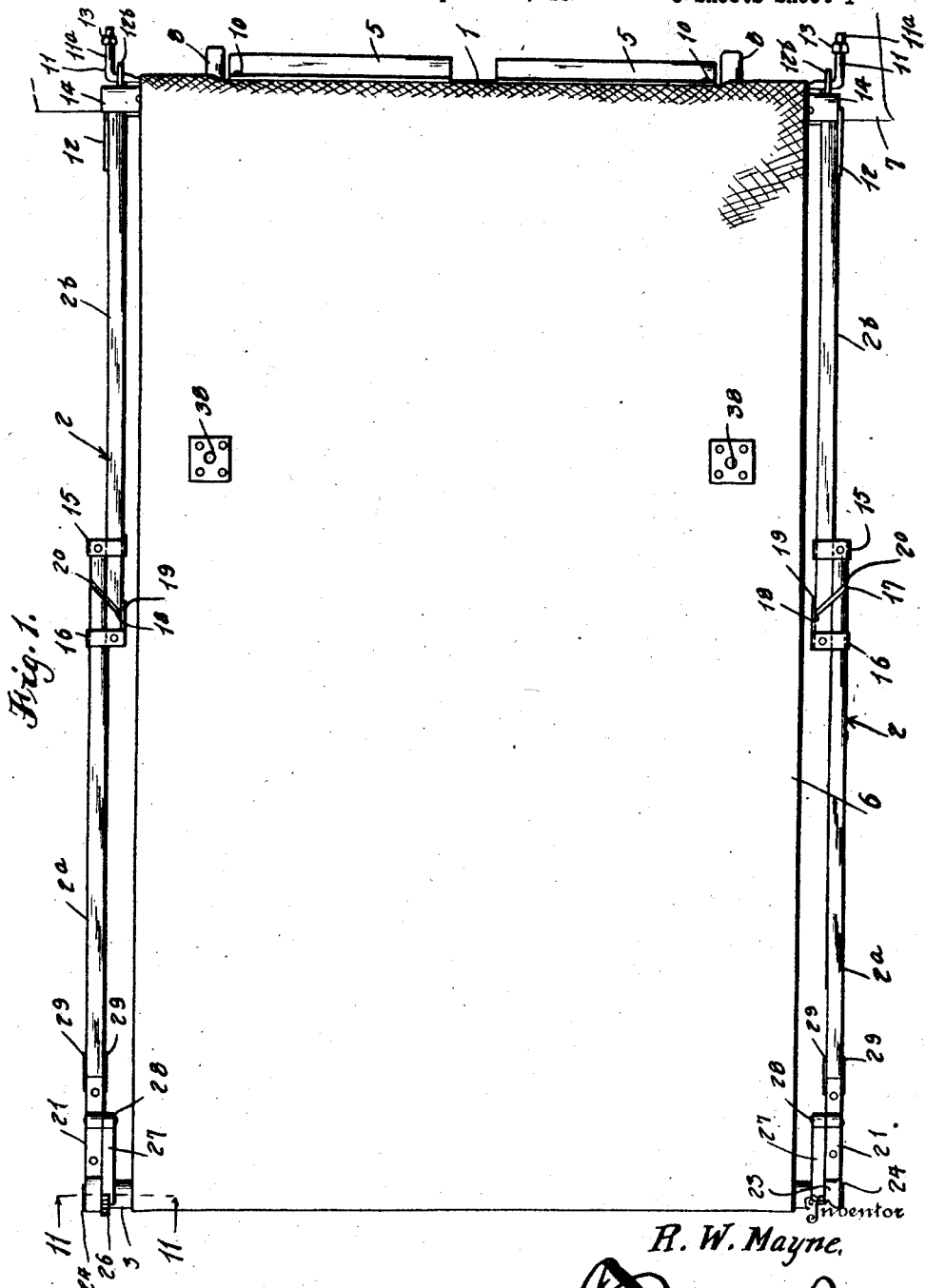

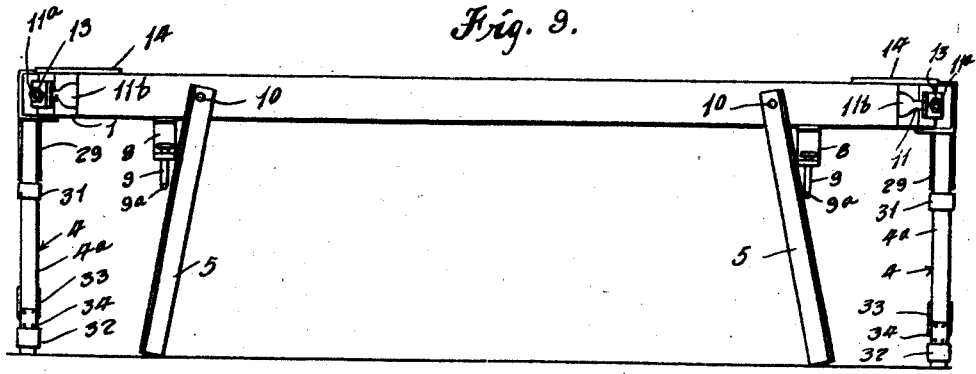
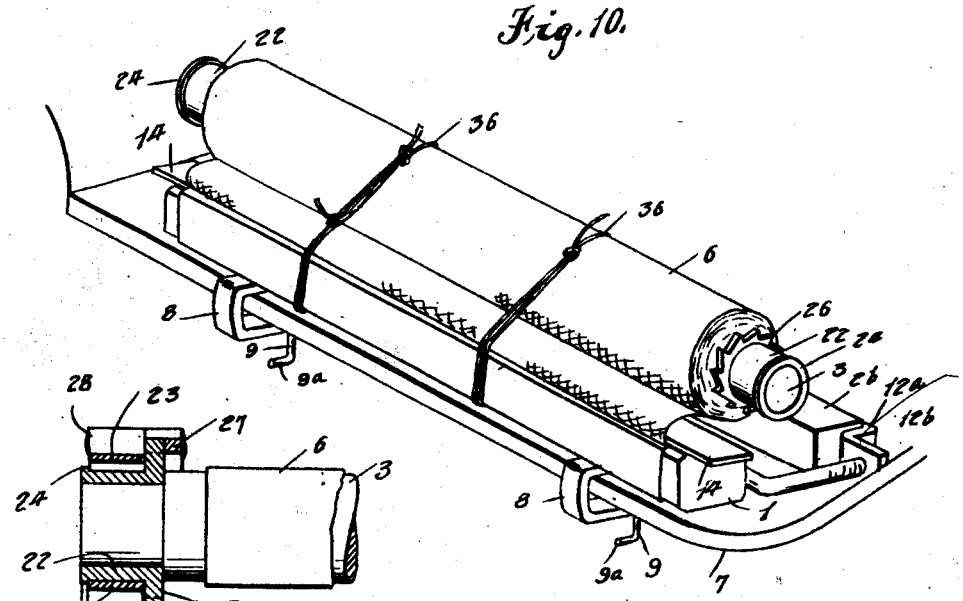
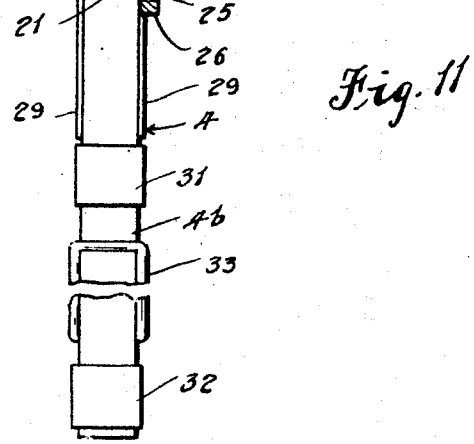

Patented Jan. 12, 1926.

1,569,772

UNITED STATES PATENT OFFICE.

RICHARD W. MAYNE, OF GLOBE, ARIZONA.

AUTOMOBILE BED.

Application filed April 24, 1924. Serial No. 708,750.

*To all whom it may concern:*

Be it known that I, RICHARD W. MAYNE, a citizen of the United States, residing at Globe, in the county of Gila and State of Arizona, have invented certain new and useful Improvements in Automobile Beds; and I do hereby declare the following to be a full, clear, and exact description of the invention, such as will enable others skilled in the art to which it appertains to make and use the same.

This invention relates to beds, and more particularly to foldable or collapsible beds for use by automobile tourists.

The invention has for its primary object the provision of a novel bed of the character stated which may be carried on a running board of an automobile in a completely and compactly folded condition or in a partly folded condition, the bed forming a luggage carrier when in partly folded condition.

A further object of the invention is the provision of a bed of the character stated which may be supported at one end from the running board of the automobile or which may be erected for use entirely independently of the automobile, and which may be readily attached to and detached from the running board.

A further object of the invention is the provision of a bed of the character stated which is simple and durable and which may be manufactured and sold at a comparatively low cost.

With the above and other objects in view, the invention consists in the construction, combination and arrangement of parts hereinafter fully described and claimed, and illustrated in the accompanying drawings, wherein:

Figure 1 is a top plan view of a bed constructed in accordance with my invention, the bed being shown attached at one end to the running board of an automobile, Figure 2 is a view in side elevation of the bed, the running board being shown in vertical section, Figure 3 is a perspective view illustrating the bed in partly folded condition in which condition the bed provides the automobile with a baggage carrier, Figure 4 is a detail top plan view of one of the front corners of the bed, Figure 5 is a detail sectional view taken on the vertical plane indicated by the line 5—5 of Figure 4, Figure 6 is a detail top plan view of one of the rear corners of the bed, Figure 7 is a detail sectional view taken on the vertical plane indicated by the line 7—7 of Figure 6, Figure 8 is a detail sectional view taken on the vertical plane indicated by the line 8—8 of Figure 6, Figure 9 is a view in end elevation of the bed when supported independently of the automobile, Figure 10 is a perspective view illustrating the bed completely folded upon the running board of an automobile, and Figure 11 is a detail sectional view taken on the vertical plane indicated by the line 11—11 of Figure 1.

Referring to the drawings by reference numerals, 1 designates the head bar, 2 the side rails, 3 the foot bar, 4 the front legs, 5 the rear legs, and 6 the mattress of a folding bed constructed in accordance with my invention.

The bed may be supported by the legs 4 and 5, as shown in Figure 9, or it may, as shown in Figure 1 be supported by the front legs 4 and the running board 7 of an automobile. To permit the bed to be connected to the running board 7, U-shaped brackets 8 are secured to the under side of the head bar 1 for application to the running board in the manner illustrated in Figure 2. Screws 9 are carried by the brackets 8 and are adapted to be turned through the medium of handles 9ª into contact with the running board 7 in order to prevent the accidental disconnection of the bed from the running board. The rear legs 5, which are preferably made of angle iron, are pivoted to the head bar 1 as at 10 to permit them to be folded into parallel relation with the head bar, as shown in Figure 1, when the bed is attached to the running board 7. When in position for use, the rear legs 5 extend downwardly and outwardly from the head bar 1 and engage the inner sides of the brackets 8, as shown in Figure 9. Due to their engagement with the brackets 8 and their outward inclination when in position for use, the rear legs 5 are held against any pivotal movement with respect to the head bar 1.

The bed is foldable. It may, as shown in Figure 10 be completely and compactly folded upon the running board 7, or it may, as shown in Figure 3, be partly folded on the running board. When partly folded the bed functions as a baggage holder. In order to permit the bed to be folded, the side rails 2 are pivotally and slidably connected to the head bar 1 and are of sectional formation, the mattress 6 is made of any suitable flexible material such as canvas, the foot bar 3 is detachably connected to the side rails 2, and the front feet 4 are pivoted to the side rails 2.

The connection between the side rails 2 and the head bar 1 is established by angular bolts 11 secured to the head bar and by metal straps 12 secured to the side rails and having a pivotal and slidable connection with the bolts. The parts 11 and 12 are held against accidental disconnection by nuts 13 on the bolts 11. The portions 11$^a$ of the bolts 11 extend rearwardly from the head bar 1, and the portions 11$^b$ of the bolts are secured to the head bar. The plates 12 are offset as at 12$^a$, and their inwardly offset portions 12$^b$ engage the portions 11$^b$ of the bolts 11 when the bed is erected. When the bed is folded, the portions 12$^b$ of the plates 12 engage the portions 11$^a$ of the bolts 11. To prevent any turning movement of the head bar 1 with respect to the side rails 2 when the bed is erected, plates 14 are secured to the upper side of the head bar 1 for engagement with the upper sides of the side rails 2 and the straps 12, as show in Figures 6 and 7. The connection between the side rails 2 and the head bar 1 is such that the side rails may be readily folded into a position in rear of the head bar 1 when it is desired to fold the bed or move it into a forwardly extending position with respect to the head bar 1 when it is desired to erect the bed. To move the side rails 2 from their erected to their folded position, it is only necessary to swing them outwardly onto the rearwardly extending portions 11$^a$ of the bolts 11 and thence swing them inwardly on said portions of the bolts until they rest upon the brackets 8. By reversing this operation, the side rails 2 may be moved from their folded to their erected position. The side rails 2 each comprise similar section 2$^a$ and 2$^b$ slidably connected by metal sleeves 15 and 16. The sleeves 15 are secured to the side rail sections 2$^a$ and embrace the side rail sections 2$^b$. The sleeves 16 are secured to the side rail sections 2$^b$ and embrace the side rail sections 2$^a$. The side rail sections 2$^a$ and 2$^b$ are locked in extended relation by loops 17 pivotally secured by plates 18 in grooves 19 in the sections 2$^b$ and removably engaging in grooves 20 in the sections 2$^a$. The side rail sections 2$^a$ and 2$^b$ may be unlocked by sliding the sections 2$^a$ forwardly with respect to the sections 2$^b$ until the loops 17 are clear of the grooves 20. After the side sections 2$^a$ and 2$^b$ are unlocked, the length of the side rails 2 may be reduced in order to permit the compact folding of the bed by sliding the sections 2$^a$ forwardly with respect to the sections 2$^b$.

The foot bar 3 is of cylindrical formation. It is journaled at its ends in bearings 21 secured to the front ends of the side rails 2. The mattress 6 is secured at one end to the head bar 1 and at its other end to the foot bar 3. As the foot bar 3 is rotatably mounted it may be turned to place the mattress 6 under a desired tension when the bed is erected, and turned to fully or partly wind the mattress thereon when folding the bed. The foot bar 3 is provided at its ends with wear sleeves 22 which fit in the openings 23 of the bearings 21. These sleeves are provided at their outer ends with annular flanges 24 which, as shown in Figure 11, contact with the outer sides of the bearings 21. The flanges 24 are smaller in diameter than the bearing openings 23 to permit the foot bar 3 to be readily applied to and removed from the bearings 21. The inner ends of the sleeves 22 are provided with annular flanges 25 which are larger in diameter than the bearing openings 23 and which are provided at their peripheries with ratchet teeth 26. The flanges 24 and 25 prevent the side rails and the foot bar 3 from having any relative horizontal movements. Gravity actuated dogs 27, which are pivoted as shown at 28 to the bearings 21, engage the ratchet teeth 26 and hold the foot bar 3 against any retrograde movement, whereby to maintain the mattress under the desired tension.

The front ends of the side rails 2 rest upon the upper ends of the front legs 4, and these legs have secured thereto side plates 29 which are pivoted as shown at 30 to the side rails 2. The front legs 4 are of sectional formation, and the sections 4$^a$ and 4$^b$ thereof are slidably connected together to permit their length to be varied in order that the mattress 6 may be supported horizontally regardless of the difference in elevation of the ground upon which the automobile rests and the ground upon which the legs rest. The leg sections 4$^a$ and 4$^b$ are connected together by sleeves 31 secured to the sections 4$^b$ and embracing the sections 4$^a$, and by sleeves 32 secured to the sections 4$^a$ and embracing the sections 4$^b$. The sections 4$^a$ and 4$^b$ of each leg 4 are secured in adjusted relation by a loop 33 pivotally secured to the leg section 4$^a$ by a plate 34 for engagement in one of a series of grooves 35 in the leg section 4$^b$.

As the front bar 3 may be removed from the side rails 2 and turned to wind the mattress 6 thereon, as the side rails 2 may be reduced in length, as the front legs 4 may be folded against the under sides of the side rails 2, and as the side rails 2 and front legs 4 may be moved into a position on the running board 7 inwardly of the front rail 1, it should be apparent that the bed may be compactly folded upon the running board in the manner illustrated in Figure 10. The bed is secured in folded condition by flexible elements 36 as shown in Figure 10. When desired, the bed may be partly folded as shown in Figure 3, and when so folded a part only of the mattress 6 is rolled upon the foot bar 3 and flexible elements 37 are employed to support the unfolded portion of the mattress 6 in an upwardly and inwardly extending position. These elements 37 are attached to adjacent portions of the automobile and pass around the foot bar 3 and that portion of the mattress 6 rolled thereon. To permit the elements 37 to be secured about the foot bar 3 and the portion of the mattress 6 rolled thereon, the mattress is provided with eyelets 38. When the bed is partly folded, it provides in conjunction with the running board 7 and the adjacent side of the automobile a baggage carrier.

From the foregoing description, taken in connection with the accompanying drawings, it should be apparent that I have provided a bed which may be readily attached to an automobile, which may be readily erected for use, which may be either completely and compactly folded or partly folded upon the running board of the automobile, and which is simple, durable and efficient.

It should be understood that the drawings are merely illustrative and do not pretend to give exact proportions. Furthermore, the said drawings are illustrative of a preferred construction, it being my expectation that various changes and modifications may be made without departing from the spirit and scope of the invention.

What is claimed is:

1. A bed comprising a head bar, angular bolts secured to and extending longitudinally and transversely from the head bar, side rails, straps secured to the side rails and having pivotal and slidable connection with said bolts, a foot bar removably secured to the side rails, a flexible mattress, and supporting elements.

2. A bed comprising a head bar, angular bolts secured to and projecting longitudinally and transversely from the head bar, side rails, straps secured to and extending rearwardly beyond the side rails and having pivotal and slidable connection with the bolts, plates secured to the head bar and overlying the said rails, a foot bar secured removably to the side rails, a flexible mattress, and supporting elements.

3. A bed adapted to be attached to an automobile, comprising a head bar secured to the running board of the automobile, side rails, means connecting the side rails to the head bar to permit the former to be folded with respect to the latter, a foot bar detachably connected to the side rails, a flexible mattress provided intermediate its ends with eyelets and connected to the head and foot bars, that portion of the mattress between the foot bar and the eyelets being adapted to be rolled upon the foot bar, elements adapted to be passed around the rolled portion of the mattress through said eyelets and secured to the automobile to support the unrolled portion of the mattress over the running board, and legs secured to the side rails adjacent the foot bar.

4. A bed adapted to be attached to an automobile, comprising a head bar secured to and extending longitudinally of the running board of the automobile, side rails, means connecting the side rails to the head bar to permit the former to be arranged in longitudinal alinement with respect to the latter, a foot bar detachably connected to the side rails, a flexible mattress connected to the head bar and foot bar and having a portion thereof rolled upon the foot bar, and means independently of the bed for supporting the foot bar above the running board adjacent the side of the automobile, and legs secured to the side rails.

5. A bed adapted to be attached to an automobile, comprising a mattress secured at one end to the running board of the automobile, a foot bar connected to the mattress and upon which a portion thereof is wound, means supporting the foot bar above the running board adjacent the side of the automobile to provide a luggage carrier, and means for supporting the foot bar when the mattress is extended to form a bed.

In testimony whereof I affix my signature.

RICHARD W. MAYNE.